United States Patent [19]

Comer

[11] 3,709,278
[45] Jan. 9, 1973

[54] RETAINER FOR MOUNTING TRUCK TIRES
[76] Inventor: George W. Comer, P.O. Box 72, White Pine, Calif. 95256
[22] Filed: May 21, 1971
[21] Appl. No.: 145,713

[52] U.S. Cl....................................157/1, 154/1.33
[51] Int. Cl...............................................B60c 25/00
[58] Field of Search.........................157/1, 1.1, 1.33

[56] References Cited

UNITED STATES PATENTS 2,609,037  9/1952  Titus..........................................157/1
2,476,209  7/1949  Monheit.....................................157/1
2,710,054  6/1955  Merriman..................................157/1
2,835,318  5/1958  Conger.......................................157/1
3,559,715  2/1971  Leslie.........................................157/1

Primary Examiner—Granville Y. Custer, Jr.
Attorney—Gary M. Polumbus

[57] ABSTRACT

A retainer bar for securing the lock ring used on truck wheels having tube type tires includes a notch for removably attaching the retainer bar to the truck wheel and an elongated portion for overlying the lock ring to hold it in place during inflation of the tire.

7 Claims, 3 Drawing Figures

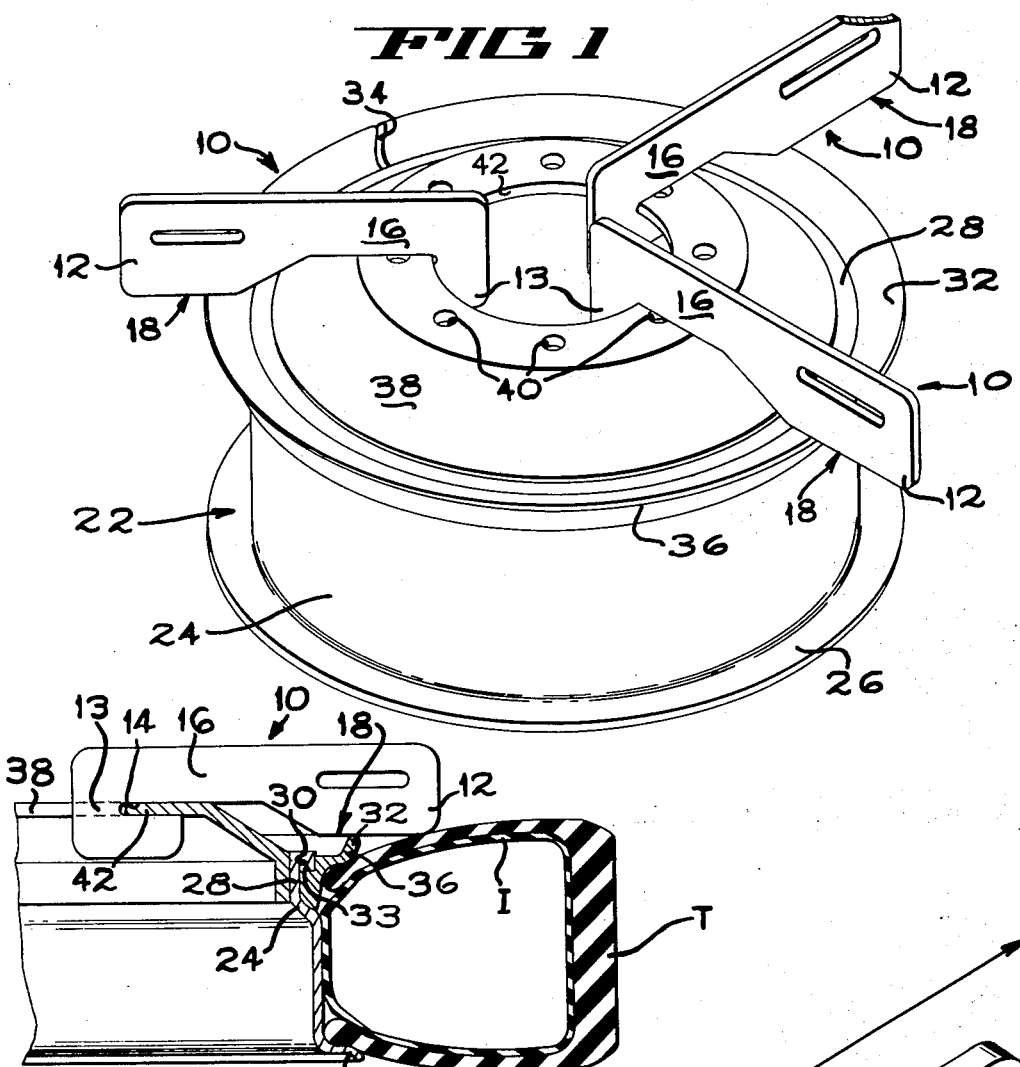
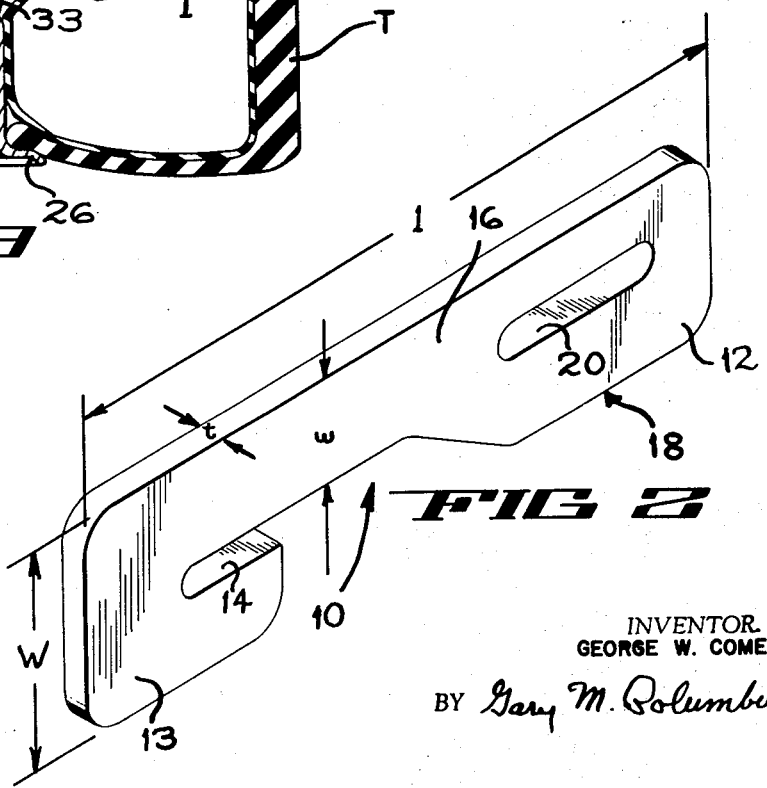

RETAINER FOR MOUNTING TRUCK TIRES

BACKGROUND OF THE INVENTION

1. Field of the Invention

Wheels for mounting tube type truck tires are unique in that they have only one annular integral abutment lip against which the tire can be sealed. The side of the tire not sealed against the integral abutment lip is sealed against a removable lock ring which is placed on the wheel after the tube and tire have been placed on the wheel.

Not infrequently, the lock ring will unavoidably suddenly fly off the wheel with great momentum as the tire is being inflated, thus becoming a potentially hazardous and sometimes lethal projectile. These lock rings, being relatively heavy, have been known to go through the roof of a garage and have on numerous occasions mortally wounded or permanently maimed tire attendants.

To overcome and prevent the above dangers, several devices have been contrived to hold the lock ring adjacent the wheel in the event it is unavoidably suddenly released during inflation of the tire. One such device is comprised of a cage type apparatus which is provided with an elongated opening into which the wheel and tire can be rolled prior to inflation. The cage supports the wheel from both sides whereby if the lock ring is unavoidably suddenly released, the cage will catch the ring before it can cause any physical harm.

Another prior art device consists of two straight bars interconnected at their midpoints by a flexible chain. One bar lays across one side of the wheel and abuts against the integral annular abutment lip on the wheel, while the chain passes through the hub opening in the wheel and holds the other bar in abutment against the lock ring on the opposite side of the wheel.

It can be seen that both prior art devices would inhibit movement of a lock ring which was suddenly released from a wheel, but neither provides a positive means for holding the lock ring on the wheel to prohibit its being released. Both devices are also relatively awkward to use requiring unnecessary labor hours when used over a long period of time.

2. Summary of the Invention

The present invention is generally concerned with apparatus for mounting tires on wheels and more particularly with a retainer device for positively holding in place, during inflation of the tire, the lock ring which is used to hold one side of tube type truck tires on specially adapted wheels.

The retainer device, in its disclosed form, is comprised of three separate but identical retainer bars, each having means thereon for removably securing the bar to a truck wheel and a portion for overlying the lock ring whereby movement of the lock ring away from the wheel is prohibited. The means for securing the bar to the wheel is simply an elongate notch which is adapted to fit tightly onto the annular flange of the wheel which defines the central hub opening. The bars can, therefore, be quickly and easily secured to the wheel and just as quickly and easily removed to provide a reliable system for retaining the lock ring on the wheel during inflation of a tire mounted on the wheel. Using this system a tire attendant would be confident that the lock ring would not fly off the wheel and possibly cause physical harm to him or his surroundings.

It is accordingly an object of the present invention to provide a retainer device for positively holding a lock ring on a wheel on which a tube type truck tire is mounted.

It is another object of the present invention to provide a retainer bar for holding a lock ring on a wheel on which a tube type truck tire is mounted, the retainer bar having means for removably securing it to the wheel.

It is still another object to provide a retainer device for use in holding a lock ring on a wheel on which a tube type truck tire is mounted, the retainer being adapted to be quickly secured to or removed from the wheel.

BRIEF DESCRIPTION OF THE DRAWINGS

FIG. 1 is an isometric view of the retainer device of the present invention mounted on a truck wheel having a lock ring for holding a tire on the wheel.

FIG. 2 is an enlarged isometric view of a retainer bar of the present invention.

FIG. 3 is a fragmentary section through a wheel with a tube type tire thereon and a retainer bar secured to the wheel and overlying the lock ring to hold it in place.

DESCRIPTION OF A PREFERRED EMBODIMENT

Referring first to FIG. 2, a retainer bar 10 of the present invention is seen to be made of a relatively flat elongated bar having two flat faces 12, only one of which is shown. In a preferred form, the bar is made of high strength steel and is approximately 9½ inches in length 1, 4 inches in maximum width W, 2 inches in minimum width w, and one-half inch in thickness t. One end of the bar 10 comprises a hook 13 defining an elongated slot 14 which passes from face-to-face through the bar and is adapted to tightly fit onto a truck wheel in a manner to be described hereinafter. The bar has a relatively narrow intermediate neck portion 16 and an enlarged head 18 which is proportioned to engage a lock ring, to be described later, used on truck wheels having tube type tires mounted thereon. An enclosed slot 20 is provided in the head portion of the bar whick provides a gripping surface to facilitate manual manipulation of the bar when attaching the bar to or detaching the bar from a wheel, or can be used to hang the bar up on a nail or other suitable hanger, when the bar is not in use.

The utility of the retainer bar is best illustrated in FIGS. 1 and 3 where it is seen attached to a truck wheel 22 of the type designed to carry tube type tires. A typical truck wheel on which tube type tires are mounted has a cylindrical body 24 with an annular integral lip 26 at one end thereof against which a portion of one side of a tire T can rest. The other end of the body 24 is provided with an annular gripping member 28 that has an annular recess 30 in which a mating portion of a lock ring 32 can be removably received. The lock ring 32 is provided with an annular bead 33 designed to be matingly received in the recess 30 of the gripping member 28. The lock ring 32 is split at 34 (FIG. 1) whereby the ring can be expanded to fit down over the gripping member 28 and abut in locked relationship with the member. A protruding annular lip 36 on the lock ring holds the tire T and tube I on the wheel whereby they are confined between the protruding lip 36 on the lock ring and the integral lip 26 on the other end of the cylindrical body when the lock ring is attached to the wheel.

At the end of the wheel body 24 adjacent the gripping member 28, an inwardly extending annular flange 38 is provided with stud holes 40 to enable the wheel to be secured to the wheel drum of a truck. The inwardmost extent of the flange 38 defines the hub opening 42 of the wheel. The thickness of the flange 38 is substantially equivalent to the width of the slot 14 in the hooked end of the retainer bar 10 whereby the bar can be hooked onto the flange by merely placing the hooked end of the bar into the hub opening 42 of the wheel while holding the bar in a horizontal position and pulling the bar 10 in a radial direction until the flange 38 slides tightly into the slot 14 as shown clearly in FIG. 3. With the retainer bar 10 so attached to the wheel, the head 18 of the bar overlies in abutting relationship the lock ring 32 thus preventing the lock ring from being released at that location from the gripping member 28 on the wheel. In actual practive a plurality of the retainer bars (three being illustrated in FIG. 1) are attached to the wheel to constitute a retainer device that safely holds the lock ring on the wheel so that it cannot fly off as the tire T is being inflated.

In actual tests, retainer bars as hereindisclosed and made of a high strength steel individually withstood 1,600 lbs. of applied load before they began to bend. It is, therefore, seen that when three of the retainer bars are used, a total force of 4,800 lbs. could be withstood before the retainer device would even begin to give way to a lock ring. The strength of the device is clearly far greater than any load which could possibly be placed on the device in actual application in the tire industry, thus providing a large safety factor for tire attendants.

When mounting a tube type truck tire using the retainer device of the present invention, the wheel 22 would first be laid on the ground with the integral lip 26 adjacent the ground. Next a tire T with a tube I contained therein would be slid onto the wheel so that a portion of one side of the tire rested against the lip 26. The lock ring 32 would then be snapped onto the gripping member 28 so that the protruding lip 36 on the lock ring engaged a portion of the opposite side of the tire from the integral lip 26. A plurality of the retainer bars 10 (preferably at least three) would then be attached to the wheel 22, in the manner described hereinbefore, so that the bars are approximately equispaced around the wheel. When properly attached to the wheel the head portion 18 of the bars will overlie the lock ring in abutting relationship therewith so that the ring is positively held on the wheel and cannot be released. A tire attendant would then inflate the tube until pressure from the tire against the lock ring safely held the lock ring in place eliminating the possibility of its flying off the wheel. Finally, the retainer bars would be removed, and the wheel with the tube and tire safely mounted thereon would be ready for use.

Although the best mode contemplated for carrying out the present invention has been herein shown and described, it will be apparent that modification and variation may be made without departing from what is regarded to be the subject matter of the invention.

I claim:
1. A retainer device for use on wheels having an annular flange defining a hub opening and a lock ring for holding a tire on the wheel, comprising at least one member having a hook defining an elongate slot adapted to fit around a portion of the wheel means thereon for attaching the member of the wheel, and a portion thereof for engaging said lock ring when said member is attached to said wheel, whereby the lock ring is prevented from coming off the wheel.

2. The device of claim 1 wherein said elongate slot is adapted to fit onto the annular flange of the wheel.

3. The device of claim 2 wherein the width of said slot is substantially equivalent to the thickness of said flange.

4. The device of claim 1 wherein there are three of said members.

5. The device of claim 3 wherein said member is made of high strength steel.

6. The device of claim 3 wherein said member includes grippable means for facilitating manual manipulation thereof.

7. The device of claim 1 wherein said member is an elongated bar.

* * * * *